June 4, 1963    A. E. BROWN ETAL    3,092,167
FUEL CONTROL DEVICE FOR A GAS TURBINE ENGINE
Filed Sept. 11, 1958    5 Sheets—Sheet 1
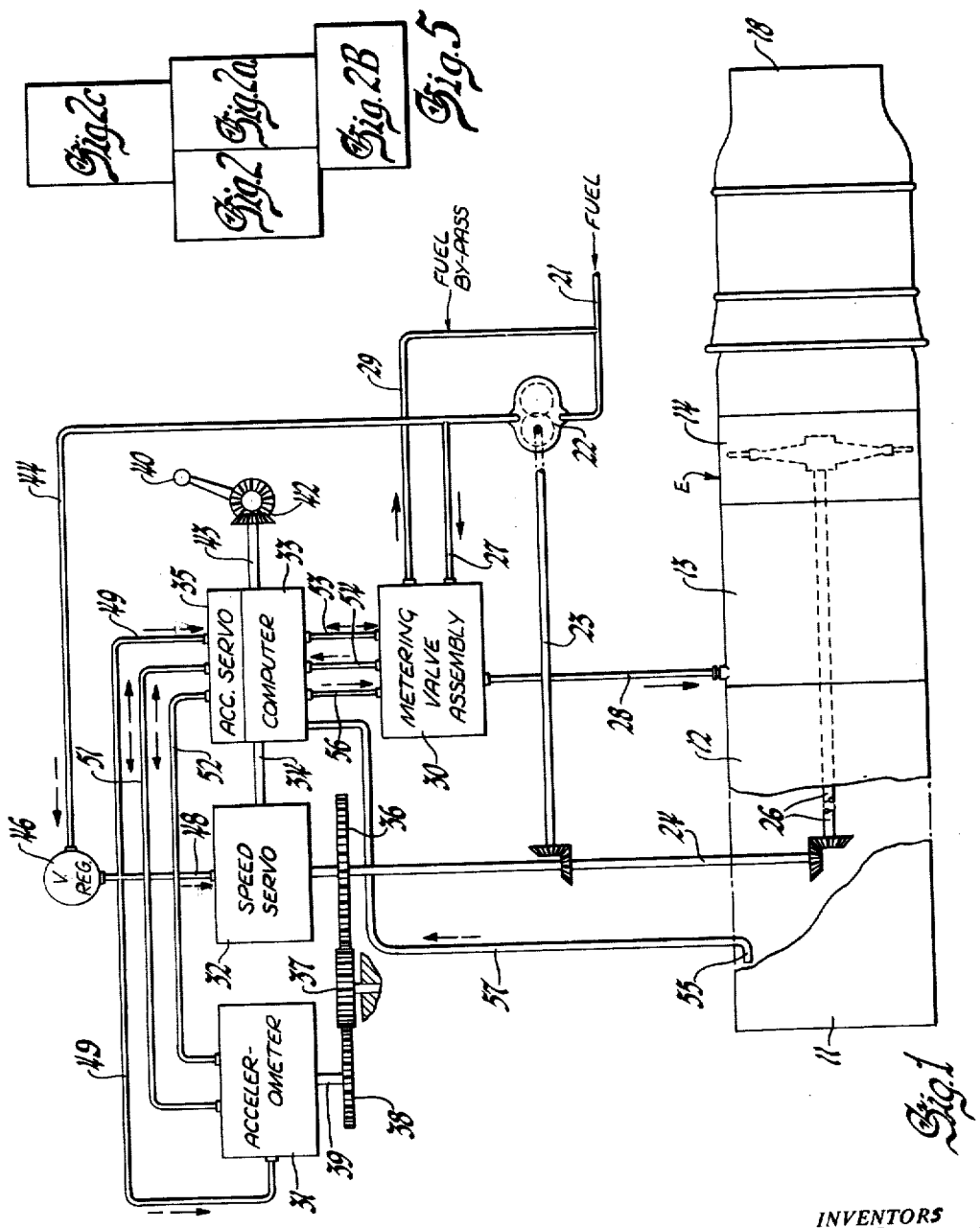
INVENTORS
Arthur E. Brown &
Edward C. Ehlke
BY
Paul Fitzpatrick
ATTORNEY

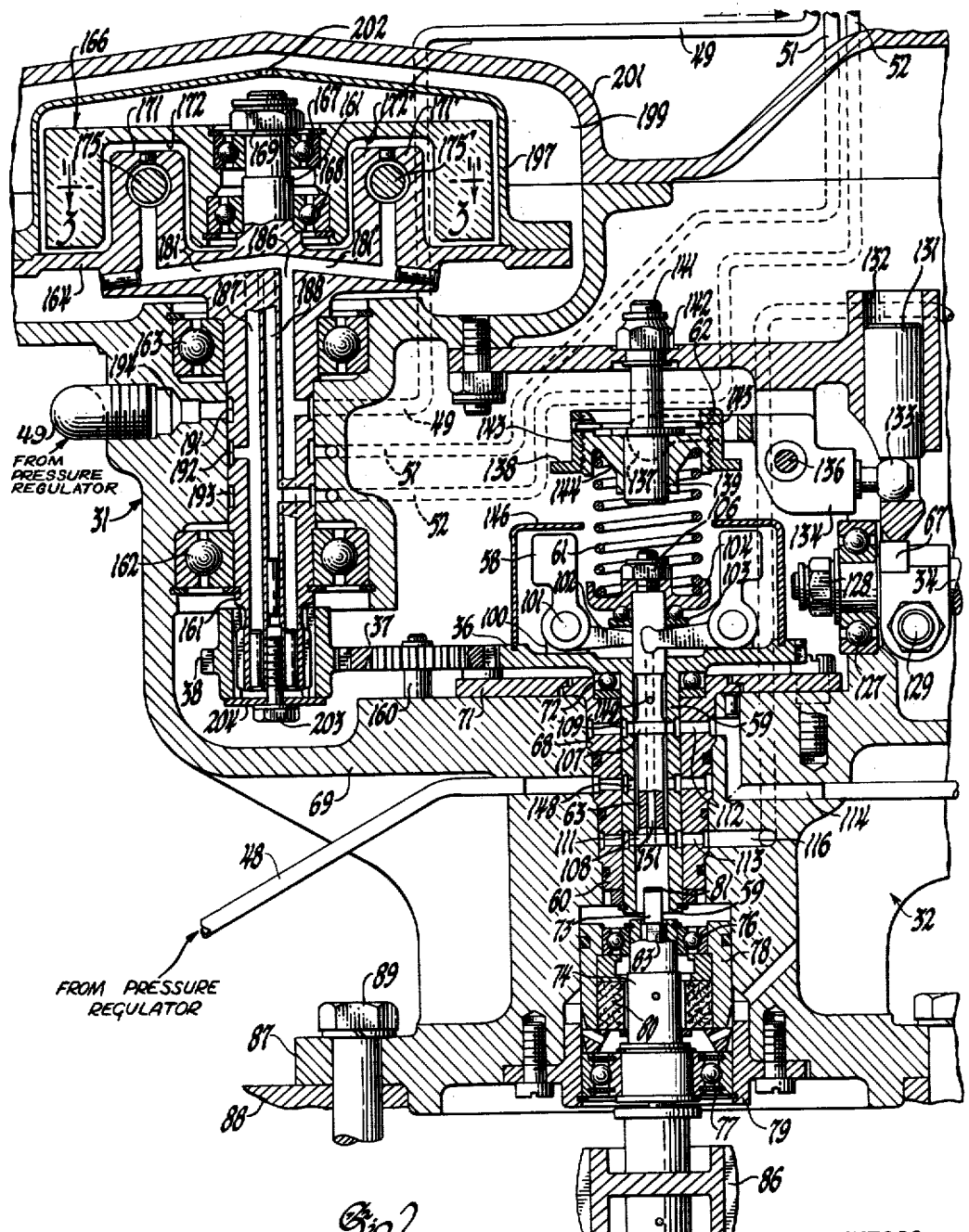

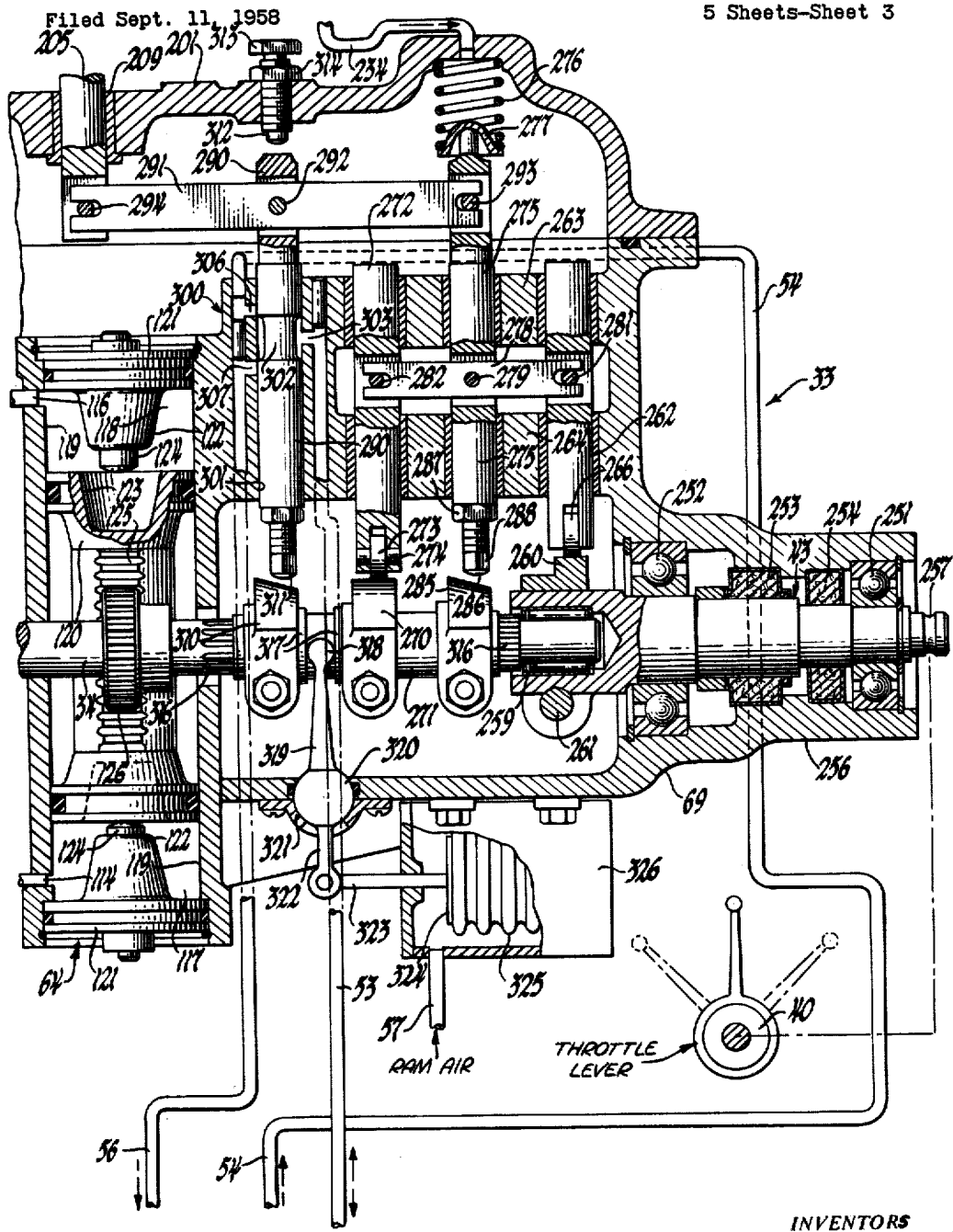

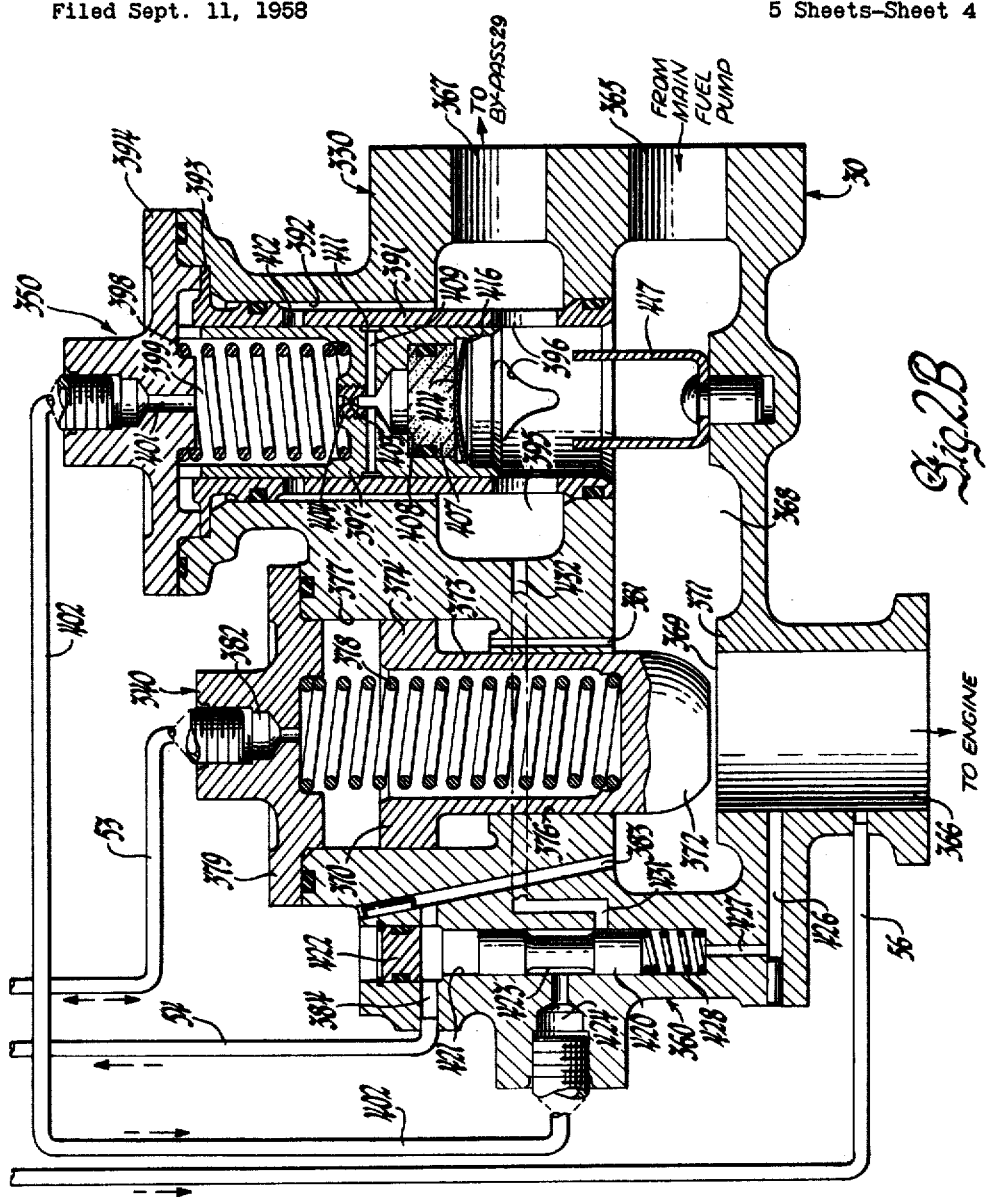

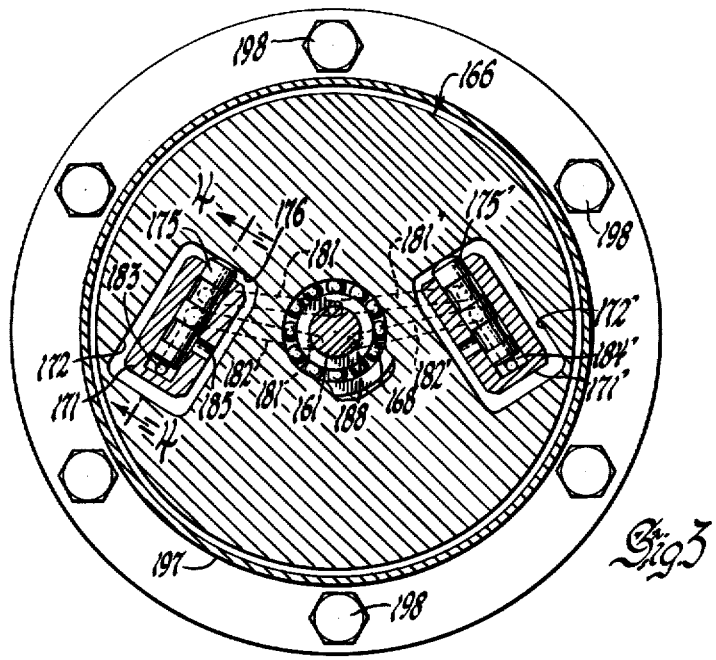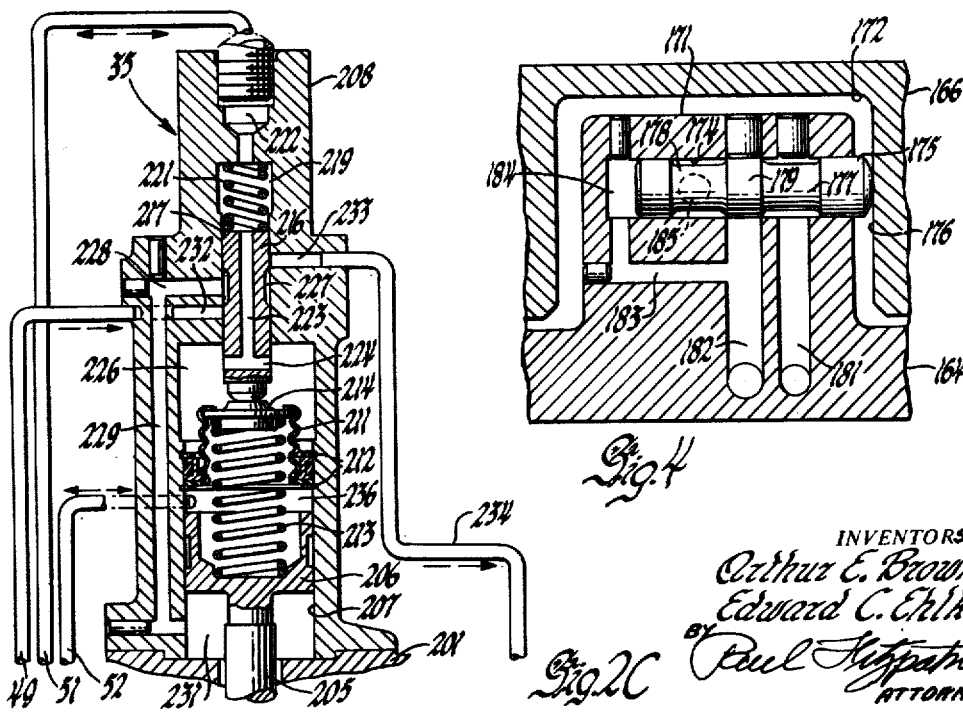

United States Patent Office 3,092,167
Patented June 4, 1963

3,092,167
FUEL CONTROL DEVICE FOR A GAS TURBINE ENGINE
Arthur E. Brown, Milwaukee, and Edward C. Ehlke, Brookfield, Wis., assignors to General Motors Corporation, Detroit, Mich., a corporation of Delaware
Filed Sept. 11, 1958, Ser. No. 760,514
7 Claims. (Cl. 158—36.4)

Our invention relates to fuel control devices particularly suited for use with gas turbine engines.

There are many varieties of fuel controls used with gas turbine engines such as turbojet and turboprop engines. One of the major problems in such controls which, so far as we are aware, has never been satisfactorily solved, is that of accelerating or decelerating the engine. This difficulty arises from the fact that the usual gas turbine engine will not tolerate too abrupt changes in fuel supply. Assuming that the engine is running under steady state conditions, and it is desired to accelerate the engine to its maximum running speed, an increase in fuel supply is necessary. Ordinarily, if fuel flow were simply increased to the value required to operate the engine at full speed, the sudden increase in fuel would overheat the turbine. Also the pressure rise because of the increase in temperature will in many cases cause surge or stall of the compressor.

Also, if the engine is running at high speed and it is to be decelerated to a low operating speed or an idling speed, the fuel may not be too abruptly reduced to the final required value. If too abrupt a decrease in fuel flow occurs, flameout of the engine is likely.

It will be appreciated that the characteristics and fuel flow tolerances of engines vary not only between different models of engines, but even between different engines of the same series and in a particular engine as its characteristics change with use.

Fuel controls such as are used for turbojet engines include means for metering fuel, which typically is controlled primarily by an engine speed governor. They also normally include mechanisms to provide acceleration and deceleration fuel schedules tailored to the particular series of engine. Because of unavoidable variations between individual engines and between individual fuel control devices, a very considerable margin of safety in the control is required. The usual result is undue limitation of fuel on acceleration, which greatly increases engine acceleration time, and similar difficulties in decelerating.

The fuel control which is the subject of this invention obviates such difficulties by the adoption of a fuel control which primarily meters fuel on acceleration or deceleration to achieve a scheduled magnitude of acceleration or deceleration based upon the existing engine speed. By this mode of operation, much more rapid and consistent acceleration of an individual engine or of a number of engines in an installation is achieved.

The foregoing will indicate generally the nature of the invention. The nature and advantages of the invention will be fully apparent to those skilled in the art from the succeeding detailed description of a preferred embodiment of the invention in a fuel control for a turbojet engine.

The principal objects of the invention are to improve the performance of turbojet engines and other engines of similar characteristics, to provide a more accurate and reliable control of such engines, and to provide a control which is very easily adapted to engines of different characteristics.

Referring to the drawings illustrating the preferred embodiment of the invention:

FIGURE 1 is a schematic diagram of a turbojet engine fuel control system.

FIGURES 2, 2A and 2C taken together constitute a sectional view of the accelerometer, speed servo, and computer assembly of the control.

FIGURE 2B is a sectional view of the metering valve assembly of the control.

FIGURE 3 is a sectional view of the accelerometer taken on the plane indicated by the line 3—3 in FIGURE 2.

FIGURE 4 is a detail sectional view taken on the plane indicated by the line 4—4 in FIGURE 3.

FIGURE 5 is a diagram illustrating the relation of FIGURES 2, 2A, 2B, and 2C.

FIGURE 1 illustrates a conventional turbojet engine E which includes the usual air inlet 11, compressor 12, combustion apparatus 13, and turbine 14. The turbine drives the compressor, and the combustion apparatus heats the air discharged by the compressor before it enters the turbine. The turbine exhaust is delivered through a nozzle 18 to propel the vehicle. Fuel is supplied from any suitable source through a line 21 to a pump 22 preferably driven by the engine, for example, by shaft 23 driven by a shaft 24 on the engine coupled to the turbine-driven shaft 26. Fuel is delivered by the pump through a line 27 to the metering valve assembly 30 which meters the fuel supplied to the engine through a line 28. Fuel delivered by the pump in excess of the amount supplied to the engine is returned to the pump inlet through a bypass line 29.

The metering valve assembly is controlled by the control device of the invention, which, as will be seen, is a single assembly, but is represented in FIGURE 1 as comprising three major components: an accelerometer including a responsive device 31 and an output servo 35, a speed servo 32, and a computer 33. The speed servo is driven directly or indirectly by the engine driven shaft 24 which thus provides an input of engine speed to the control. The speed servo actuates an output shaft or speed shaft 34 which provides an input of actual engine speed from the speed servo to the computer.

The accelerometer 31, 35 provides an input of engine acceleration to the computer. Acceleration is positive or negative, depending upon whether engine speed is increasing or decreasing. The accelerometer head 31 is driven by the engine through shaft 24, gear 36, an idler gear 37, and a gear 38 which is mounted on a shaft 39 which drives the accelerometer. The accelerometer head provides an output of acceleration in the form of hydraulic pressures which are employed by the acceleration servo 35 in the computer to set a movable member to a position corresponding to acceleration.

In addition to the speed and acceleration inputs to the computer, it receives a control input, which may be regarded as a speed setting or a desired speed signal, from a manually operable control 40 connected by any suitable means, indicated by bevel gears 42, to a speed request shaft or control shaft 43 entering the computer. The computer includes a pilot valve which hydraulically controls a main fuel metering valve in the metering valve assembly 30. These valves will be described.

Fluid under pressure for operation of the control may be taken from any suitable source, but preferably is taken from the outlet of fuel pump 22. Fuel pump 22 is connected by a pressure line 44 and a regulating valve 46 to servo fuel supply lines 48 and 49 supplying the speed servo and the accelerometer and acceleration servo, respectively. The purpose of the regulating valve, which may be of conventional construction, is to provide a constant pressure suitable for operation of the hydraulic mechanisms of the fuel control. The accelerometer head 31 is connected to the servo 35 in the computer by fluid pressure lines 51 and 52 which conduct pressure senses representative of acceleration from the accelerometer to the computer.

The fuel metering valve in the metering valve assembly 30 is controlled by the pressure of fuel supplied to the metering valve assembly by the computer 33 through line 53. The pressure in line 53 is controlled by a pilot valve which may connect line 53 to line 54 containing fuel under pump discharge pressure, or to a line 56 containing metered fuel under the pressure at which it is supplied to the engine through line 28. A ram pressure probe 55 in the engine inlet is connected to the computer by a pressure line 57.

The structure indicated schematically in FIGURE 1 is shown in detail in the remaining figures.

The Speed Servo

We may begin by describing the speed servo which is indicated by the block 32 on FIGURE 1 and is shown in detail in FIGURES 2 and 2A. This device is rotated by the engine at a speed proportional to engine speed and sets the angular position of speed shaft 34 at a value corresponding to engine speed. The speed responsive device comprises flyweights 58 mounted on the face of gear 36 which is integral with a hollow shaft 59 rotated by the engine. The centrifugal effect on the flyweights is resisted by a compression spring (speeder spring) 61 backed up by an abutment 62 movable axially of shaft 59. The shaft 59 constitutes one member of a servo valve 60, the other being a servo valve spool 63 which is coupled to the flyweights. Valve spool 63 controls the supply of fluid under pressure to either end of a servo cylinder 64 (FIGURE 2A) which sets the angular position of speed shaft 34 in the computer 33. Shaft 34 mounts a speed feedback cam 67 which operates through a mechanical linkage to adjust abutment 62 and thereby control the loading of speeder spring 61. The speed of shaft 34 determines the centrifugal force generated by the flyweights and the pilot valve spool 63 responds to any movement of the flyweights from their normal position to operate the servo cylinder 64 to adjust abutment 62 and thereby return the flyweights and the valve spool to their normal position. In so doing, the shaft 34 is rotated to a position which is a direct function of engine speed. The rotation of shaft 34 may be directly proportional to speed.

Proceeding now to the details of the speed servo, hollow shaft 59 is rotatable in a bushing 68 retained in a bore in the casing or housing 69 of the fuel control assembly by a hold-down plate 71. A thrust bearing 72 is provided between gear 36 and the upper surface of sleeve 68. The lower end of shaft 59 is coupled by a noncircular coupling member 73 to a shaft 74 rotatably mounted in the housing 69 by ball bearings 76 and 77. These bearings are retained on the shaft 74 by snap rings and are mounted in sleeves 78 and 79 retained in a recess in the case coaxial with shaft 74. Suitable shaft seals 80 are provided. The key 73 may have a rectangular portion received in a cross slot 81 in the lower end of shaft 59 and a square or hexagonal end 83 received in a suitably shaped opening in the upper end of shaft 74. Shaft 74 is provided with a splined input connection 86 by which it may be coupled to the engine. A flange 87 on case 69 may be fixed to the structure 88 of the engine by bolts 89.

The flyweights 58 are rotatably mounted on pivots 101 mounted in bosses 100 extending from the upper face of gear 36. These pivots may include ball bearings. The flyweights are integral with arms 102 which bear against lower race 103 of a ball thrust bearing, the upper race of which is a cup 104 which receives the lower end of speeder spring 61. Cup 104 is fixed to the upper end of valve spool 63 by a nut 106.

Valve spool 63 is reciprocable within the interior bore of hollow shaft 59. The spool comprises lands 107 and 108 which, in the neutral position of the valve, cover ports 109 and 111 in the shaft 59. Ports 109 and 111 communicate through radial passages 112 and 113 in the sleeve 68 with passages 114 and 116 which communicate respectively with the chambers 117 and 118 at the ends of cylinder 119 of the servometer 64. A servo piston 120 is reciprocable in the cylinder, and the ends of the cylinder are closed by heads 121 retained by snap rings. Conical projections 122 on the heads entering sockets 123 in the ends of the pistons act as hydraulic dampers at the ends of the piston stroke. Adjustable limit stops 124 may be provided in the heads 121. Piston 120 has integral with it a rack 125 which engages a pinion 126 on the speed shaft 34. Shaft 34 is rotatably mounted in a ball bearing 127 fixed in the case 69 and retained on the shaft by a nut 128. The right end of the shaft is also supported by means which will be described.

Feedback cam 67 is adjustably fixed to shaft 34 by a clamping bolt and nut 129. The cam surface of cam 67 engages a follower 131 reciprocable in a bore 132 in the case. A transverse opening in the follower 131 receives a ball 133 which constitutes one end of a bellcrank 134 pivoted on a shaft 136 mounted in the case. On the other end of bellcrank 134 is a clevis having rounded ends 137 which engage a flange 138 on the abutment 62 at opposite sides of the axis of the abutment. Abutment 62 is reciprocable on the cylindrical end portion 139 of a post 141 fixed to a web of the case 69 by nut 142. Abutment 62 comprises an outer ring 143 and an inner ring 144 threaded together for adjustment of spring 61. An expanding spring ring 145 has projections entering radial holes in the rings 143 and 144 to lock the adjustment. An annular guard 146 mounted on the gear 36 contains fluid which rotates with the flyweights 58. The interior of case 69 is filled with fuel at pump inlet pressure.

The valve 60 defined by shaft 59 and valve spool 63 is supplied with servo fuel at regulated pressure by the regulating valve 46 (FIGURE 1) through line 48 and passages in the housing 69 and sleeve 68 to ports 148 in the shaft 59 intermediate ports 109 and 111. If valve spool 63 moves up, servo fuel is admitted to port 109 and pressure line 114 to move piston 120 upwardly and increase the force of spring 61. If valve spool 63 moves downwardly, the pressure fluid is admitted to line 116 to relax the spring. Fluid exhausted from the cylinder through line 114 may pass through radial ports 149 and an axial passage 151 in the valve stem to the lower end of shaft 59 and fluid exhausted from line 116 may also exhaust through the open lower end of shaft 59 and into the case 69. If will be seen that the valve 60 and servo cylinder 64 act to load spring 61 so as to hold the valve in neutral position. The loading of spring 61, therefore, is directly responsive to the speed of the engine. The contour of cam 67 is preferably such that the rotation of shaft 34 is directly proportional to the speed of the engine. It will be assumed in the succeeding description that this is the case.

The Accelerometer

The accelerometer portion of the control comprises an acceleration head 31 indicated as an accelerometer in FIGURE 1 and the servomechanism 35 which is structurally integrated with the computer 33. The acceleration head, which generates fluid pressures indicative of acceleration, is shown at the upper left of FIGURE 2 and the servomechanism 35, which moves an output member to a position indicative of the amount of acceleration, is shown in FIGURE 2C.

Considering first the acceleration head which is driven by the engine; the gear 36, idler 37 and gear 38 indicated in FIGURE 1 are also identified in FIGURE 2. Idler 37 is rotatably mounted on the support 160 fixed to the case 69. Gear 38 is fixed to an accelerometer shaft 161 rotatably mounted in the case 69 by ball bearings 162 and 163 retained by snap rings. The accelerometer shaft 161 is integral with a flange or head 164. An inertia wheel or flywheel 166 (see also FIGURE 3) is rotatably mounted on the upper end of shaft 161 by ball bearings 167 and 168. The outer races of these bearings are retained in the inertia wheel by snap rings and the bearings are retained on shaft 161 by a nut 169.

The inertia wheel 166 is driven by shaft 161 through hydraulic torque measuring means. The torque required to drive the wheel 166 is proportional to acceleration, and this torque determines hydraulic pressures which provide a measure of acceleration which in turn is converted to position of a movable member by the acceleration servo 35, to be described. Two bosses 171 and 171' project from the upper surface of flange 164 into recesses 172 and 172' in the wheel 166. Each of these bosses is provided with a blind bore which receives a plunger. Referring to FIGURES 3 and 4, the boss 171 has a blind bore 174 within which is reciprocably mounted a plunger 175, one end of which abuts the surface 176 of the recess 172. It will be noted that the plunger is perpendicular to a radial line drawn from its point of engagement with surface 176 to the axis of rotation. Two grooves 177 and 178 on the plunger define lands at each end of the plunger and a central land 179. Servo fuel under controlled pressure is supplied through a passage 181 in the head which communicates with the groove 177. A controlled pressure passage 182 registers with, and is substantially coextensive with, land 179. A branch passage 183 connects passage 182 with chamber 184 behind plunger 175. The ends of the bores which provide these passages are closed by plugs brazed in place. An exhaust port 185 communicates with groove 178. The plunger and valve arrangement 175' in the boss 171' is identical to that just described, but acts in the opposite direction. Passages 181 and 181' connect with a passage 186 extending through the shaft 161 and closed at its lower end by a brazed plug. Passages 182 and 182' communicate respectively with passages 187 and 188 extending through the shaft 161 and closed at the lower end of the shaft by plugs. Radial passages or ports connect the passages 186, 187 and 188, respectively, with grooves 191, 192 and 193 in the outer surface of shaft 161. Groove 191 is connected by a port 194 in the case to the controlled pressure line 49 leading from the regulating valve 46. Groove 191 also connects to the continuation of line 49 which conducts the controlled pressure to the accelerometer servo 35 (FIGURE 2C) in the computer. Grooves 192 and 193 connect to lines 51 and 52.

A few further structural details of the accelerometer may be mentioned. The inertia weight 166 is enclosed by an annular cover 197 fixed to the flange 164 by a ring of bolts 198. The inertia head rotates in a closed chamber 199 defined by the case 69 and a cover 201 suitably fixed to the case. This chamber remains full of fuel which exhausts from the bores 174, and is vented by a central opening 202 in cover 197. The drive gear 38 is retained on shaft 161 by a cap screw 203 threaded into the end of the shaft and a washer 204.

Proceeding now to the operation of the acceleration head to generate the acceleration responsive pressures, it will be remembered that the pressure in passages 181 and 181' is controlled to a desired value. Referring to FIGURES 3 and 4, if the inertia wheel moves counterclockwise with respect to the shaft (positive acceleration of the engine), plunger 175 will move to the left in FIGURE 4 to admit fluid under pressure from passage 181 to passage 182 and chamber 184. This pressure acting on the end of plunger 175 provides a torque against the inertia wheel. If the inertia wheel rotates clockwise with respect to the shaft, plunger 175 will move to the right as shown in FIGURE 4, connecting chamber 184 through passages 183 and 182 and groove 178 of the plunger to the drain outlet 185. When shaft 161 is rotated at constant speed and the system is stable, the torque required to turn the inertia wheel is a negligible value and the two plungers 175 and 175' will be in their neutral position. The pressures in lines 182 and 182' will be substantially balanced, and the force exerted by the plungers 175 and 175' on the inertia wheel will be substantially equal. The actual pressures in lines 182 and 182' will be some value lower than that in the supply passages 181 and 181', since fluid may leak from these passages and from chamber 184 into the drain 185. If the shaft 161 accelerates, the inertia wheel lags slightly, operating valve 175 to increase the pressure in chamber 184 and operating valve 175' to decrease the pressure in chamber 184'. The difference between the pressures in the two chambers is proportional to the torque required to accelerate the inertia wheel. This action is accompanied by very slight angular displacement of the inertia wheel with respect to the shaft, which displacement is immaterial. If shaft 161 decelerates, the reverse action takes place. It will be seen, therefore, that the inertia head responds equally well to positive or negative accelerations.

*The Acceleration Servo*

We may now consider the acceleration servo 35 shown in FIGURE 2C which acts to displace a piston rod 205 in either direction from a neutral position by an amount proportional to the acceleration of shaft 161 and, therefore, of the engine. Rod 205 is integral with a piston 206 reciprocable in a cylinder 207 defined by housing 208 mounted on the cover 201 by bolts or other suitable means (not shown). The lower end of the cylinder is defined by the cover 201, and the piston rod reciprocates in a bushing 209. Above piston 206 in cylinder 207, an expansible bellows 211 is mounted by snap rings 212. A compression spring 213 is disposed in a recess in the upper face of the piston 206 and extends to bear against the head 214 of the bellows. A pilot valve spool 216 is reciprocable in a valve bore 217 coaxial with cylinder 207. The upper end of the valve spool communicates with the chamber 219 within which is mounted a compression spring 221 biasing the spool downwardly. Accelerometer pressure line 51 is connected through a port 222 to chamber 219. The valve spool has a central passage 223 and radial ports 224 which connect chamber 219 with a chamber 226 above the bellows 211. A groove 227 in the valve spool is in communication through a port 228 and passage 229 with the chamber 231 below the piston 206. The controlled pressure fluid line 49 terminates in a port 232 immediately below groove 227 when the spool 216 is in its neutral position. A port 233 immediately above groove 227 when the spool is in its neutral position connects to a drain line 234 which may connect to the interior of the case 69, which is drained. As shown, the line 234 is connected to the cover 201 of the case. Accelerometer pressure line 52 connects to a chamber 236 between piston 206 and bellows 211.

Proceeding to the operation of the acceleration servo, it may be pointed out that valve spool 216 is hydraulically balanced, having equal pressures on both ends. The pressure exerted on the upper end of bellows 211 is that in line 51 connected to the chamber 184 of the acceleration head. The pressure exerted on the lower face of bellows 211 and on the upper face of piston 206 is that in line 52 which is connected to chamber 184' of the acceleration head. The pressure in chamber 231 below piston 206 may be varied between the controlled servo fuel pressure in line 49 and the pump inlet pressure of drain line 234. The device is coupled to the engine so that shaft 161 rotates clockwise as viewed in FIGURE 3, and, therefore, positive acceleration of the engine results in increasing pressure behind plunger 175 and thereby increasing pressure in line 51, and in decreasing pressure in line 52. Thus, the pressure in chamber 226 above bellows 211 becomes greater than that in chamber 236 below the bellows. As a result, head 214 will move downwardly, compressing spring 213, and spring 221 will move valve spool 216 downwardly, connecting pressure fluid port 232 with the chamber 231 below piston 206. The piston will move upwardly, compressing spring 213 and extending bellows 211 until the valve spool 216 has returned to neutral position. The greater the acceleration, the greater the difference in pressure on the two sides of bellows 211 and the higher piston 206 will rise to compress spring 213 to balance these pressures. Thus the displacement of stem 205 is proportional to acceleration.

If the engine decelerates, pressure in chamber 236 is greater than that in chamber 226 and the bellows moves valve spool 216 upwardly, connecting chamber 231 to the drain line 233 and allowing the piston 206 to descend until spring 213 is relaxed sufficiently to allow bellows 211 to collapse sufficiently to close the drain from chamber 231.

When the acceleration is zero, the pressures in chambers 226 and 236 are equal and the force exerted by spring 221 equals that exerted by spring 213 when valve spool 216 is in neutral position so that the bellows is in balance. The force exerted by spring 221 is constant except for the intermittent variation due to the slight movement of the valve spool. Likewise, the position of head 214 is constant under any steady state condition of acceleration or deceleration and varies only sufficiently to operate the valve spool. Piston 206 acts, therefore, to load spring 213 to compensate for the difference in pressure, either positive or negative, between chambers 226 and 236. Piston rod 205 provides the acceleration input to the computer, the structure of which is illustrated in detail in FIGURE 2A.

The Computer

The computer 33 comprises mechanism mounted in the case 69. Two of the inputs to this mechanism have been described. Shaft 34 is rotated in proportion to engine speed. Piston rod 205 is reciprocated in either direction from its neutral position as a measure of engine acceleration.

The computer also, as indicated on the schematic of FIGURE 1, receives an input from the control or throttle lever 40 which is coupled by any suitable mechanism to the throttle input or speed request shaft 43 of the computer. This shaft is mounted in bearings 251 and 252 and cooperates with seals 253 and 254 mounted in a bored-out boss 256 which is part of the case 69. The outer end 257 of shaft 43 is configured for adjustable mounting of a suitable input arm, as is customary. The inner end of shaft 43 is bored to receive a needle bearing 259 which supports the inner end of speed shaft 34. Throttle cam 260 is fixed to the inner end of shaft 43 by a clamping bolt 261. This cam is suitably contoured to translate the rotation of shaft 43 into reciprocation of a slide 262 mounted in bushings in webs 263 and 264 of the case 69. A roller 266 on the lower end of slide 262 engages the peripheral cam surface of cam 260.

A speed cam 270 clamped on a sleeve 271 splined to shaft 34 for rotation therewith actuates a speed slide 272 through a roller 273 mounted on pin 274. This slide is mounted similarly to slide 262. An acceleration limiting slide 275 is mounted similarly to slides 262 and 272 and between them. Slide 275 is biased downwardly by compresion spring 276 retained between the cover 201 and a cap 277 engaging the upper end of slide 275. A floating link 278 is fulcrumed on slide 275 by a pin or bolt 279. Pins or bolts 281 and 282 extending transversely of the slides 262 and 272, respectively, extend through forks in the ends of floating link 278. Spring 276 biases slides 262, 272, and 275 downwardly and normally maintains the followers in engagement with cams 260 and 270. Downward movement of slide 275 is limited by acceleration limiting cam 285 clamped on sleeve 271. This cam provides a limit to the downward movement of slide 275 which varies with engine speed. A cam follower 286 threaded into slide 275 and locked by a nut 287 provides for adjustment of the position of slide 275 relative to cam 285. A square section 288 on the follower provides for application of a wrench. It will be seen that the position of slide 275 is the average of the position of slides 262 and 272 determined by cams 260 and 270 unless movement of slide 275 is limited by cam 285.

When the throttle shaft 43 is rotated to call for greater engine speed, slide 262 descends. As actual engine speed increases, cam 270 moves slide 272 upward. The position of slide 275 thus represents the speed error or difference between speed request and actual engine speed. When these two are equal, slide 275 will be in its neutral or datum position from which it moves downwardly in response to an increase in requested speed or a decrease in actual speed, and moves upwardly in response to a decrease in requested speed or an increase in actual speed.

Expressed otherwise, downward displacement of slide 275 represents a deficiency in engine speed which is treated as a request for acceleration of the engine, and conversely, upward displacement of slide 275 represents an excess in engine speed which is treated as a deceleration request. The acceleration limiting cam 285 provides a schedule of engine acceleration in terms of engine speed. The rate at which the engine may be accelerated without danger of surge or stall or overtemperature is a function of engine speed. Cam 285 is contoured in accordance with the characteristics of the engine with which the control is to be used to set this safe schedule. If, for example, the engine is operating at a low speed, the throttle input 43 may be moved to the maximum position to call for full engine speed. In this case, the large initial movement of slide 262 lowers slide 275 until tappet 286 rides on cam 285 to set up a maximum allowable acceleration request. The immediate result of the acceleration request will be an increase in engine fuel which causes the engine to increase its speed. As the speed increases, shaft 34 will turn accordingly, adjusting the acceleration request through cam 285 to the value allowable at each value of engine speed as it increases.

The acceleration request indicated by the position of slide 275 is balanced against the actual acceleration indicated by the position of rod 205 to increase or decrease fuel flow to the engine as required and as suitable. The mechanism for this includes a rate of change of fuel flow slide 290, the position of which determines the rate of change of fuel flow to the engine.

A floating link 291 is coupled by a pin 292 to the rate of change of fuel flow slide 290 and by pins 293 and 294 to the slide 275 and the rod 205. The position of slide 290 is therefore determined by the relation between acceleration request indicated by slide 275 and actual acceleration indicated by rod 205. When these are equal, slide 290 will be in its neutral position. If the acceleration is greater than that requested, slide 290 moves upward from its neutral position illustrated, and if actual acceleration is less than that requested, it moves downward. If the control shaft 43 remains stationary and engine speed wanders, both the speed input through cam 270 and the acceleration input through rod 205 act on slide 290 to call for correction of fuel flow.

The rate of change of fuel flow slide 290 forms a part of fuel pilot valve 300. The stationary part of the valve is defined by a bore 301 in the case 69 in which slide 290 reciprocates. A groove 302 in the slide is constantly in communication with a port 303 which connects to pressure line 53 which controls the position of the fuel metering valve (to be described) in the metering valve assembly 30. Upward or downward movement of slide 290 connects port 303 either to a port 306 or a port 307. The former is connected to line 54 and the latter to line 56, which communicate with sources of fuel in the metering valve assembly.

Line 54 is supplied with fuel under pump outlet pressure and line 56 connects with the line through which fuel is supplied to the engine, which is at lower pressure because of the drop through the metering valve. The manner in which the metering valve operates and is controlled will be clear after the subsequent explanation of the structure and operation of the metering valve assembly. For understanding the computer, it will suffice to point out that if slide 290 moves upwardly, fuel under pressure is supplied from line 54 through port 306 and port 303 into line 53 to actuate a piston to close a metering valve and thus reduce fuel flow to the engine. Conversely, if slide 290 moves downward, fuel is bled from line 53 into line 56 allowing the metering valve to open and increase fuel flow to the engine.

With the engine operating at a steady state, if more speed is called for, the right end of link 291 will be moved downward about pin 294 and more fuel will be supplied. The resulting acceleration of the engine will raise rod 205 and when rod 205 is moved upwardly to the extent necessary to close off port 307, the opening movement of the metering valve is terminated. Since the downward movement of slide 275 is limited by the acceleration limiting cam, this provides one limit to the amount of opening of port 307 and thus to the rate of change of fuel flow.

It is also desirable to limit rate of change of fuel flow independently of the limitation of acceleration. This is accomplished by a rate of change of fuel flow limiting cam 310 clamped on sleeve 271. Rate of change of fuel flow limiting cam 310 cooperates with an adjustable follower 311 threaded into the lower end of slide 290. Cam 310 is contoured to limit the amount of opening of port 307 and thus the rate of increase of fuel flow as a function of instantaneous engine speed. This assures that the rate of change of fuel flow will not be such as to create over-temperature or surge conditions.

It is also desirable to prevent too rapid decrease in the amount of fuel supplied to the engine. It is not necessary for the negative rate of change of fuel flow to have a speed scheduled limit, and therefore a fixed limit is provided by an adjustable stop 312 which may be engaged by slide 290. Stop 312 is threaded into cover 201 and may be adjusted by a head 313 and locked by jam nut 314.

A feature of the computer which has not been described may be termed the altitude compensation. In view of the wide variation of pressure of air entering the engine, due primarily to altitude effects but also resulting from changes in forward-speed of the engine, the schedules of acceleration limit and rate of change of fuel flow limit should be varied as a function of total or ram pressure of the air entering the engine. As previously pointed out, cams 270, 285 and 310 are mounted on sleeve 271 splined to speed shaft 34. Cam 270 is cylindrical in the geometric sense. Cams 285 and 310 are three-dimensional cams. The effective contour of cams 285 and 310 may be varied by shifting sleeve 271 and, therefore, the cams axially of shaft 34. The cams are so shifted to reduce the acceleration and rate of change of fuel flow limits as inlet pressure decreases. Inlet pressure is sensed by the total pressure probe 55 in the engine air inlet 11 which is connected by pressure line 57 to the computer. Means are provided by which ram air pressure shifts sleeve 271 axially of shaft 34 to adjust the acceleration and rate of change of fuel flow schedules as a function of ram pressure in addition to the change of schedules as a function of engine speed.

Shaft 34 is provided with splines 316 on which the internally splined sleeve 271 is axially slidable. Two flanges 317 on the sleeve define a groove in which the clevis end 318 of an arm 319 engages. Arm 319 projects from a cylindrical stub shaft 320 mounted in a recess in the case and retained by a cover plate 321. The case 69 and cover 321 provide a fulcrum for shaft 320. An arm 322 extending from shaft 320 is coupled by a rod 323 to the head 324 of an evacuated bellows 325, the other end of which is fixed. Bellows 325 is mounted within a closed housing 326 fixed to the under side of case 69. Pressure conduit 57 admits air to the housing 326 externally of the bellows 325. As ram pressure increases, bellows 325 will be compressed by the ram pressure and will actuate arms 322 and 319 to shift the cams 285 and 310 to a different contour. Cam 270 is also shifted, but this has no effect on the contour of that cam.

The ram air pressure responsive means is illustrated somewhat schematically and, in practice, would preferably include a servomechanism (not illustrated) to provide more accurate response to ram air pressure. Since such servomechanisms are well known, it is deemed unnecessary to illustrate or describe the details thereof. Any power servo coupling the bellows 325 to the arm 322 might be employed.

*The Metering Valve Assembly*

The metering valve assembly 30 illustrated in FIGURE 2B comprises a case or housing 330 within which is housed a fuel metering valve 340, a bypass control valve 350 which returns excess fuel to the pump, and a metering head control valve 360 which responds to the pressure drop across the metering valve 340 and controls the position of the bypass valve 350 to maintain this metering head at a constant predetermined value.

Fuel enters the metering valve assembly through a port 365 connected to line 27 (FIGURE 1), is discharged to the engine through a port 366 connected to line 28, and the excess fuel is returned from port 367 through line 29 to the pump inlet. Inlet 365 communicates with outlet 366 through a chamber 368 and the annular opening 369 between an annular seat 371 at the inner end of outlet 366 and the contoured end 372 of the movable metering valve member 370. The metering valve member 370 comprises a stem 373 and a flange or piston 374. The stem is reciprocable in a bore 376 and the piston reciprocates in a cylinder 377. The piston is hollow and provides an abutment for a compression spring 378, the other end of which is retained by a cylinder head 379 suitably fixed to the body 330.

Proceeding to the operation of metering valve 340, it will be noted that metered fuel pressure (the pressure of fuel delivered to the engine) is exerted on the lower end of valve stem 373. Pump outlet pressure is communicated to the lower face of piston 374 through a drilled passage 381. A port 382 in the cylinder head 379 connects the chamber above piston 374 to the control line 53 leading to the fuel pilot valve 300. Passages 383 and 384 in the valve housing 330 connect the fuel pump outlet (chamber 368) to line 54 leading to valve 300. If valve 300 moves up, pump outlet pressure is delivered to the entire upper surface of the valve member 370. Since a large part of the lower surface of this member is exposed to the pressure of metered fuel in the outlet 366, and the valve member is biased downwardly by spring 378, fuel will be admitted to the upper surface of the valve member to close the metering orifice 369. On the other hand, if valve 300 moves downward, the upper surface of valve member 370 is connected to metered fuel pressure, whereas part of the lower surface is exposed to pump discharge pressure. The difference in pressure is sufficient to lift the valve against spring 378 and thus open orifice 369. Spring 378 is provided principally to hold the metering valve at its minimum opening when there is little or no pressure from the main fuel pump, as in the initial stages of engine starting and when the engine is shut down. The minimum and maximum areas of the metering orifice 369 may be determined by engagement of piston 374 with the ends of the cylinder, or adjustable limit stops for valve member 370 may be provided in the head 379 and in the outlet 366.

The flow through orifice 369 is a function of the area of the orifice and of the pressure drop across it. Since means to be described are provided to keep the pressure drop constant, flow is a direct function of the area and, therefore, of the position of valve member 370. The nose portion 372 of this member is contoured so that the area increases approximately as an exponential function of the displacement of the valve member from its closed position. In other words, the increments of fuel flow for equal increments of movement of the valve increase in geometric progression.

Since the pressure drop across the metering valve is held constant, the difference of the pressures in lines 54 and 56 remains constant. The pressure in line 56 is substantially that exerted on the lower end of stem 373 and the pressure in line 54 equals that exerted on the lower face of piston 374. In view of these facts, the rate of movement of valve member 373 is substantially directly proportional to the opening of port 306 or 307 and thus to the displacement of slide 290. From this it follows that the ratio of rate of change of fuel flow to instantaneous fuel flow is substantially proportional to displacement of slide 290. Regardless of the actual fuel flow to the engine, a given displacement of slide 290 and, therefore, rate of displacement of valve 300 will create a rate of change of fuel flow bearing the same ratio to instantaneous fuel flow.

As previously pointed out, this fuel rate is limited in the decreasing direction by stop 312 and in the increasing direction by the variable limits scheduled by the acceleration cam 285 and the rate of change of fuel flow cam 310. Either of these cams, depending upon which is engaged by its follower, will limit the increasing rate of change of fuel flow as a function of instantaneous engine speed.

We may now proceed to the structure of the bypass valve 350, which returns the necessary amount of fuel to the pump inlet to maintain the fixed pressure drop across the metering valve. The bypass valve 350 comprises a sleeve 391 mounted in a bore 392 in the housing 330 and located by a flange 393 against which a head 394 suitably fixed to the body 330 bears. The open lower end of sleeve 391 is in direct communication with the chamber 368 to which fuel is delivered by the pump. Four contoured ports 396 in the sleeve communicate with a surrounding chamber 395 which opens to the bypass outlet 367. A movable valve member 397 is slidably mounted in sleeve 391. Valve member 397 is shown in the position in which the bypass ports 396 are partly closed. As it moves downwardly, the lower edge of the valve member progressively closes ports 396. The lower face of valve member 397 is biased upwardly by pump discharge pressure exerted on its lower face. It is biased downwardly by a compression spring 398 mounted in a recess in the upper end of the valve member and bearing against the head 394. It is also biased downwardly by fluid pressure in the chamber 399 above the valve member, from which fluid may be discharged through a port 401 in head 394 and conduit 402 by the metering head control valve 360. Fuel at pump outlet pressure may leak into chamber 399 through an orifice 403 in a plug 404 threaded into the valve member 397. If the outlet through line 402 is closed, the fuel leaking through orifice 403, aided by spring 398, will move the bypass valve to close it. If fluid is discharged through line 402 faster than it enters through orifice 403, the excess of pressure on the lower face of the valve member will raise it to open the bypass valve.

Fuel is admitted to orifice 403 through a porous filter disk 407 mounted in the lower face of member 397 and a passage 408. Radial passages 409 communicating with passage 408 deliver filtered fuel under pump outlet pressure to a circumferential groove 411 in the outer surface of the valve member to wash and lubricate the sliding bearing between the valve member and sleeve 391. Ports 412 in the sleeve communicating with the bypass provide for disposal of leakage. A spring holder 414 lodged against a shoulder 416 retains the filter disk 407. A stop 417 fixed to the case may engage shoulder 416 to limit downward movement of the valve.

Proceeding now to the pressure level control valve 360, this comprises a spool 420 mounted in a bore 421 in the housing 330. This bore is closed at its upper end by a plug 422 retained by a snap ring. Valve spool 420 has lands at each end and an intermediate groove 423 which communicates through a port 424 and line 402 with the chamber 399 above the bypass valve member 397. The upper face of the valve spool 423 is exposed to metering valve inlet pressure through passage 383. The lower end of spool 420 is exposed to metering valve outlet pressure through passages 426 and 427. A compression spring 428 biases the spool 420 upwardly. A port 431 which may be closed or opened by the valve spool is connected by passage 432 to the bypass or return chamber 395. With valve spool 420 in the position shown, or in any higher position, escape of fuel from chamber 399 through the valve 360 to the bypass 367 is prevented, and the bypass valve will move in a closing direction. If spool 420 opens port 431 sufficiently to create a balance between flow into chamber 399 through orifice 403 and flow out of chamber 399 through port 431, the bypass valve will remain stationary. If spool 420 moves further down, the port 431 will be opened sufficiently to vent fluid from chamber 399 faster than it enters, and the bypass valve will open.

Since the areas at the end of spool 420 exposed to the inlet and outlet pressures of the metering valve are equal, the difference between these pressures will be maintained at a value determined by the force of spring 428 and the area of bore 421. If the metering head is greater than the desired value, the bypass valve will open to lower the metering head, returning more fuel to the pump. If the metering head is less than that desired, port 431 will be throttled to cause the bypass valve to close.

*Conclusion*

Since the operation of the control has been described, it need not be repeated in detail. However, a brief resume of the operation may be desirable.

Primary control rests with the pilot's throttle lever, which calls for an engine speed. The control system acts to hold the engine stably at the speed requested. It also acts to govern the engine quickly and stably from one speed setting to another. It is most desirable for the pilot to be able to move the power control instantly from any setting to any other. The quickest response of which the engine is capable is important, and the mode of control of this invention is best suited to obtain this result.

When the control lever is moved to call for a change in speed, the difference between the speed thus requested and the actual speed, measured by the speed servo, displaces slide 275 to indicate an acceleration request. Positive acceleration requests are limited to a value normally within the safe capability of the engine, and very close thereto, by the acceleration limiting cam 285 set by engine speed and inlet pressure.

Movement of slide 275 actuates the rate of change of fuel flow controlling valve 300 to cause a progressive change in fuel flow. The value of fuel flow integrates the displacement of valve 300.

The change in fuel flow changes engine speed, which change constantly resets the acceleration limit. The change in speed also displaces the accelerometer output of acceleration from its datum position, which feeds back to the rate of change of fuel flow controlling valve, acting to terminate the opening or closing movement of the metering valve. The actual speed output also feeds back to terminate metering valve movement. The engine will stabilize at the new speed setting with speed error and acceleration zero and valve 300 in neutral position.

Under some conditions, a limit to the rate of change of fuel flow is desirable to prevent too rapid change. This is the only limit provided when a decrease in engine speed is requested, and, for this purpose, a set limit to the displacement of valve 300 is provided.

When increasing speed and therefore fuel flow is called for displacement of valve 300 and therefore rate of change of fuel flow is limited by rate of change of fuel flow cam 310. The limit set by this cam is a function of instantaneous engine speed and inlet pressure.

It will be seen that either the acceleration or the rate of change of fuel flow limit may determine the rate of change of fuel flow when the throttle has been opened by the pilot.

By limiting rate of change of fuel flow on deceleration, and limiting both fuel rate and acceleration on acceleration, the engine may be controlled very accurately to skirt surge or stall regions and lean flameout. Very consistent, safe, and rapid response to throttle requests and stable operation during transients are assured.

The contours of the limiting cams may readily be derived from the operating characteristics of the engine determined by test running or by calculation.

The advantages of the invention will be clear to those skilled in the art from the foregoing.

The detailed description of the preferred embodiment of the invention for the purpose of explaining the principles thereof is not to be construed as limiting the invention.

The acceleration measuring mechanism referred to above as the accelerometer and acceleration servo form the subject matter of our divisional application for Accelerometer, Serial No. 226,671, filed September 27, 1962.

We claim:

1. A fuel control device for a gas turbine engine comprising, in combination, speed sensing means driven by the engine including speed output means representing actual engine speed, settable means providing a speed request, control input means actuated by the settable means providing an acceleration request, acceleration limiting means set by the speed output means and limiting the setting of the control input means in the increasing direction as a function of engine speed, acceleration sensing means driven by the engine including acceleration output means representing engine acceleration, rate of change of fuel flow controlling means coupled to the control input means and the acceleration output means and adjusted from a datum setting in response to the difference between the acceleration request from the control input and the acceleration, and displaceable fuel metering means controlled by the rate of change of fuel flow controlling means to increase and decrease fuel flow to the engine, the rate of displacement of the fuel metering means being substantially proportional to the departure of the rate of change of fuel flow controlling means from its datum setting, the metering means having an exponential characteristic of fuel flow with respect to displacement thereof.

2. A fuel control device for a gas turbine engine comprising, in combination, speed sensing means driven by the engine including speed output means representing actual engine speed, settable means providing a speed request, control input means actuated by the settable means providing an acceleration request, acceleration limiting means set by the speed output means and limiting the setting of the control input means in the increasing direction as a function of engine speed, acceleration sensing means driven by the engine including acceleration output means representing engine acceleration, rate of change of fuel flow controlling means coupled to the control input means and the acceleration output means and adjusted from a datum setting in response to the difference between the acceleration request from the control input and the acceleration, positive rate of change of fuel flow limiting means set by the speed output means and limting the setting of the rate of change of fuel flow controlling means in the increasing direction as a function of engine speed, and displaceable fuel metering means controlled by the rate of change of fuel flow controlling means to increase and decrease fuel flow to the engine, the rate of displacement of the fuel metering means being substantially proportional to the departure of the rate of change of fuel flow controlling means from its datum setting, the metering means having an exponential characteristic of fuel flow with respect to displacement thereof.

3. A fuel control device as recited in claim 2 including means responsive to engine inlet air pressure coupled to the acceleration limiting and rate of change of fuel flow limiting means operative to vary the functional relation of the limits established thereby to engine speed as a function of the inlet air pressure.

4. A fuel control device for a gas turbine engine comprising, in combination, input means settable to represent an engine speed request, speed sensing means driven by the engine including speed output means representing actual engine speed, speed error determining means actuated by the input means and the speed output means to a setting representing engine speed error and providing an acceleration request, acceleration limiting means set by the speed output means and limiting the setting of the error determining means in the increasing direction as a function of engine speed, acceleration sensing means driven by the engine including acceleration output means representing engine acceleration, rate of change of fuel flow controlling means coupled to the speed error determining means and the acceleration output means and adjusted from a datum setting in response to the difference between the acceleration request and the engine acceleration, and displaceable fuel metering means controlled by the rate of change of fuel flow controlling means to increase and decrease fuel flow to the engine, the rate of displacement of the fuel metering means being substantially proportional to the departure of the rate of change of fuel flow controlling means from its datum setting, the metering means having an exponential characteristic of fuel flow with respect to displacement thereof.

5. A fuel control device for a gas turbine engine comprising, in combination, input means settable to represent an engine speed request, speed sensing means driven by the engine including speed output means representing actual engine speed, speed error determining means actuated by the input means and the speed output means to a setting representing engine speed error and providing an acceleration request, acceleration limiting means set by the speed output means and limiting the setting of the error determining means in the increasing direction as a function of engine speed, acceleration sensing means driven by the engine including acceleration output means representing engine acceleration, rate of change of fuel flow controlling means coupled to the speed error determining means and the acceleration output means and adjusted from a datum setting in response to the difference between the acceleration request and the engine acceleration, positive rate of change of fuel flow limiting means set by the speed output means and limiting the setting of the rate of change of fuel flow controlling means in the increasing direction as a function of engine speed, and displaceable fuel metering means controlled by the rate of change of fuel flow controlling means to increase and decrease fuel flow to the engine, the rate of displacement of the fuel metering means being determined by the departure of the rate of change of fuel flow controlling means from its datum setting.

6. A fuel control device for a gas turbine engine comprising in combination, input means settable to represent an engine speed request, speed sensing means driven by the engine including speed output means representing actual engine speed, speed error determining means actuated by the input means and the speed output means to a setting representing engine speed error and providing an acceleration request, acceleration limiting means set by the speed output means and limiting the setting of the error determining means in the increasing direction as a function of engine speed, acceleration sensing means driven by the engine including acceleration output means representing engine acceleration, rate of change of fuel flow controlling means coupled to the speed error determining means and the acceleration output means and adjusted from a datum setting in response to the difference between the acceleration request and the engine acceleration, negative rate of change of fuel flow limiting means coacting with the rate of change of fuel flow controlling means, positive rate of change of fuel flow limiting means set by the speed output means and limiting the setting of the rate of change of fuel flow controlling means in an increasing direction as a function of engine speed, and displaceable fuel metering means controlled by the rate of change of fuel flow controlling means to increase and decrease fuel flow to the engine, the rate of displacement of the fuel metering means being substantially proportional to the departure of the rate of change of fuel flow controlling means from its datum setting, the metering means having an exponential characteristic of fuel flow with respect to displacement thereof.

7. A fuel control device for a gas turbine engine comprising, in combination, an input shaft settable to represent an engine speed request, speed sensing means driven by the engine including a speed output shaft representing actual engine speed, speed error determining means actuated by the input shaft and the speed output shaft to a position representing engine speed error and providing an acceleration request, acceleration limiting means set by the speed output means and limiting the setting of the error determining means in the increasing direction as a function of engine speed, acceleration sensing means driven by the engine including acceleration output means representing engine acceleration, rate of change of fuel flow controlling valve means coupled to the speed error determining means and the acceleration output means and adjusted from a datum setting in response to the difference between the acceleration request and the engine acceleration, negative rate of change of fuel flow limiting means coacting with the rate of change of fuel flow controlling means, positive rate of change of fuel flow limiting means set by the speed output shaft and limiting the setting of the rate of change of fuel flow controlling means in the increasing direction as a function of engine speed, and displaceable fuel metering valve means controlled by the rate of change of fuel flow controlling valve means to increase and decrease fuel flow to the engine, the rate of displacement of the fuel metering valve means being substantially proportional to the departure of the rate of change of fuel flow controlling valve means from its datum setting, the metering valve means having an exponential characteristic of fuel flow with respect to the displacement thereof.

References Cited in the file of this patent

UNITED STATES PATENTS

| | | |
|---|---|---|
| 2,498,118 | Weiss | Feb. 21, 1950 |
| 2,631,677 | Kochenburger et al. | Mar. 17, 1953 |
| 2,633,830 | McCourty et al. | Apr. 7, 1953 |
| 2,670,716 | Worster et al. | Mar. 2, 1954 |
| 2,672,335 | Keller | Mar. 16, 1954 |
| 2,746,427 | Dolza et al. | May 22, 1956 |
| 2,761,495 | Greenland | Sept. 4, 1956 |
| 2,769,488 | Harris et al. | Nov. 6, 1956 |

UNITED STATES PATENT OFFICE
CERTIFICATE OF CORRECTION

Patent No. 3,092,167　　　　　　　　　　　　　　　　June 4, 1963

Arthur E. Brown et al.

It is hereby certified that error appears in the above numbered patent requiring correction and that the said Letters Patent should read as corrected below.

Column 4, line 4, for "servometer" read -- servomotor --; column 7, lines 58 and 59, for "compresion" read -- compression --; column 11, line 71, for "holder" read -- spider --; column 13, line 70, for "limting" read -- limiting --.

Signed and sealed this 24th day of December 1963.

(SEAL)
Attest:

ERNEST W. SWIDER

Attesting Officer

EDWIN L. REYNOLDS

Acting Commissioner of Patents